Dec. 30, 1941.  R. C. TOWNSEND  2,268,465
FRONT AXLE AND FIFTH WHEEL CONSTRUCTION
Original Filed Aug. 4, 1937  2 Sheets-Sheet 1

Inventor
Roy C. Townsend
By Philip A. H. Sewell
Atty.

Dec. 30, 1941.  R. C. TOWNSEND  2,268,465
FRONT AXLE AND FIFTH WHEEL CONSTRUCTION
Original Filed Aug. 4, 1937  2 Sheets-Sheet 2
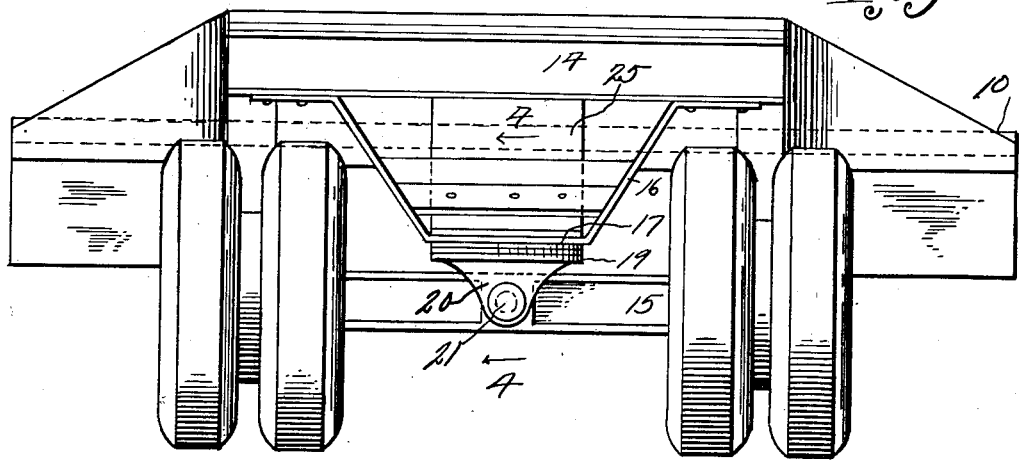
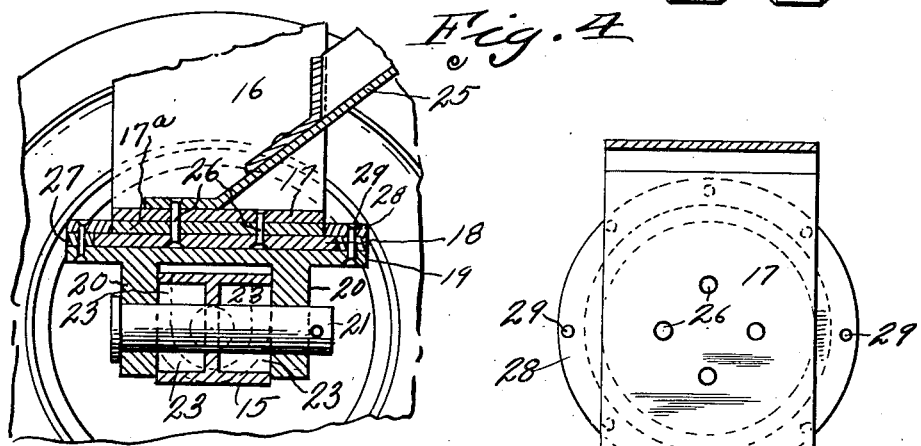
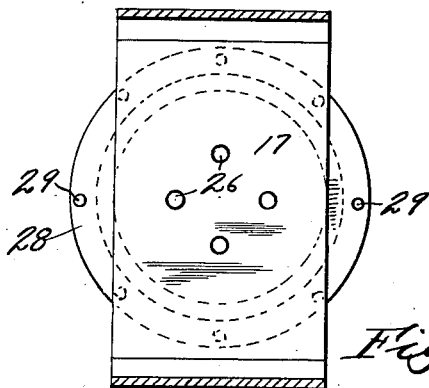
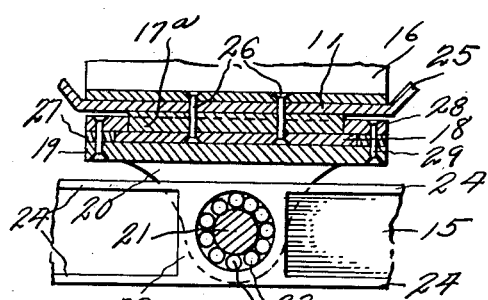
Inventor
Roy C. Townsend
By Philip A. H. Purcell
Atty.

Patented Dec. 30, 1941

2,268,465

UNITED STATES PATENT OFFICE 2,268,465

FRONT AXLE AND FIFTH WHEEL CONSTRUCTION

Roy Chester Townsend, La Crosse, Wis.

Original application August 4, 1937, Serial No. 157,385. Divided and this application June 8, 1940, Serial No. 339,540

1 Claim. (Cl. 280—109)

The invention relates to trailers and particularly to a front axle and fifth wheel structure wherein the axle is rockably mounted in a bifurcation carried by the lower plate of the fifth wheel.

A further object is to rockably mount the forward axle and to provide a fifth wheel for the forward axle, adjacent the forward axle, and relatively low, thereby obviating the necessity of providing braces for the forward axle, consequently allowing complete pivotal movement of the axle.

A further object is to mount the lower part of the fifth wheel on a bracket having arms disposed at opposite sides of the axle and a pivot pin extending through the arms and axle and having anti-frictional bearings within the axle.

A further object is to provide the downwardly extending pedestal with a fifth wheel disc rotatably mounted within a chamber of the lower portion of the fifth wheel and adjacent the axle, thereby lowering the fifth wheel and obviating the necessity of providing braces for the axle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a front elevation of the trailer.

Figure 4 is a vertical transverse sectional view through the fifth wheel and axle, taken on line 4—4 of Figure 3.

Figure 5 is a top plan view of the fifth wheel and the lower portion of the pedestal.

Figure 6 is a transverse sectional view, vertically through the fifth wheel.

Figure 1:
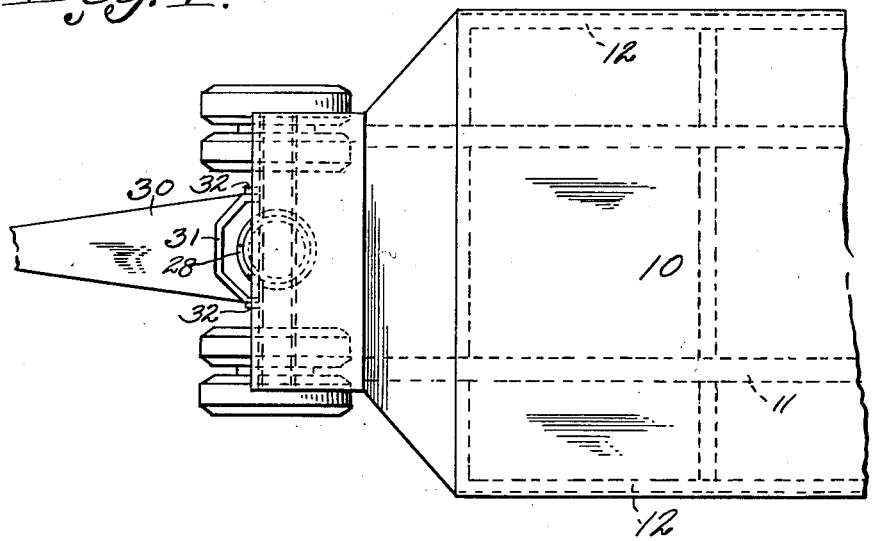
Figure 1 is a top plan view of the forward end of the trailer.
Figure 2:
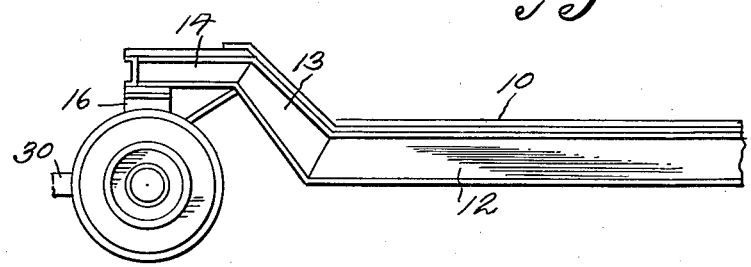
Figure 2 is a side elevation of the forward end of the trailer.

The present invention is a divisional part of my application, Serial No. 157,385, filed August 4, 1937.

Referring to the drawings, the numeral 10 designates the body of the trailer, which is supported on a frame 11, the side bars 12 of which extend rearwardly and may have attached thereto, in any suitable manner, a conventional form of rear wheel carrying structure.

The forward ends of the side bars 12 incline upwardly and inwardly and forwardly at 13 and terminate in horizontal parallel portions 14 above the forward axle 15. Extending downwardly from the body portion 14 is a pedestal 16, preferably V-shaped as shown, and which pedestal has secured to its horizontal portion 17 the upper portion 18 of the fifth wheel. The upper portion of the fifth wheel is relatively close to the pivoted axle 15 and is rotatably mounted within a chamber of the lower fifth wheel portion 19, therefore it will be seen that the axle may swing in a horizontal plane over a relatively wide range and by the low position of the fifth wheel it will not be necessary to provide brace means for the axle 15. The lower fifth wheel portion 19 is provided with downwardly extending arms 20 at opposite sides of the axle 15, and which arms and horizontal pin 21 form means whereby the axle may rock in various vertical planes as the vehicle moves over the ground. It will be noted that axle 15 is of I-beam type and has an enlarged central portion 22 between the flanges thereof and in which are disposed bearing elements 23 on which the pin 21 bears. Arms 20 engage the outer ends of the bearings 23 and in combination with the flanges 24 of the I-beam axle maintain the bearings in position. In other words the arms 20 form a closure for the bearing raceways. The lower end of the pedestal 16 is braced by an upwardly and rearwardly extending brace member 25 and it will be noted that the upper portion of the fifth wheel is built up from a plurality of plates connected together by rivets 26. The lower portion of the fifth wheel is built up by means of an annular ring 27 secured to the plate 19 between said plate and the annular ring 28 and secured by rivets 29.

It will be noted that the interior diameter of the annular member 27 is greater than the interior diameter of the annular member 28, hence it will be seen that the fifth wheel plate 18 will have a bearing between the plate 19 and the annular member 28, thereby forming a positive fifth wheel structure.

A hinged draft bar 30 may be connected to the axle and is provided with a bifurcated end 31, transversely arching the fifth wheel structure and having its arms hingedly connected at 32 to the forward side of the axle.

From the above it will be seen that a fifth wheel structure is provided for heavy duty trailers which is relatively low and close to the axle, and the pin 21 forms a bearing for the rollers within the lines of the axle and a conventional form of I-beam may be used for the axle by building up the portions 22 between the flanges 24 of the axle.

The invention having been set forth what is claimed as new and useful is:

The combination with a horizontally disposed fifth wheel structure comprising a lower section, an upper section pivotally mounted in the lower section, of a transversely rockable axle mounting below and relatively close to the lower section of the fifth wheel structure, said mounting comprising downwardly extending members on opposite sides of the axle and between which the axle rocks, a horizontally disposed rock pin extending through said downwardly extending members and through the axle on the longitudinal center of the axle and forming means whereby said axle is positioned relatively close to the lower fifth wheel member said axle being I-shaped in vertical transverse cross section, filler members between the flanges of the axle and forming a bearing raceway concentrically around the pin, roller bearings within said raceway, said pin forming a bearing for said roller bearings.

ROY C. TOWNSEND.